Jan. 20, 1970   G. CHAMBERLAIN   3,490,129
HOSE CLAMP AFFIXING APPARATUS
Filed Sept. 19, 1967   3 Sheets-Sheet 1

INVENTOR
GEORGE CHAMBERLAIN
BY Silverman & Coss
ATTORNEYS

Jan. 20, 1970  G. CHAMBERLAIN  3,490,129
HOSE CLAMP AFFIXING APPARATUS
Filed Sept. 19, 1967  3 Sheets-Sheet 2

INVENTOR
GEORGE CHAMBERLAIN
BY Silverman & Cass
ATTORNEYS

Jan. 20, 1970   G. CHAMBERLAIN   3,490,129
HOSE CLAMP AFFIXING APPARATUS
Filed Sept. 19, 1967   3 Sheets-Sheet 3

INVENTOR
GEORGE CHAMBERLAIN
BY Silverman & Cass
ATTORNEYS

United States Patent Office 3,490,129
Patented Jan. 20, 1970

3,490,129
HOSE CLAMP AFFIXING APPARATUS
George Chamberlain, Cicero, Ill., assignor to Wittek Manufacturing Co., Chicago, Ill., a corporation of Illinois
Filed Sept. 19, 1967, Ser. No. 668,786
Int. Cl. B23p *19/04*
U.S. Cl. 29—237                                       7 Claims

ABSTRACT OF THE DISCLOSURE

Apparatus for affixing a hose clamp having a reverse-bent bight-forming tine to the end section of a hose. A support and abutment surface is provided to receive the end face of the hose and a reciprocating mandrel is slidably mounted on the support surface within the confines of the hose circumference to move radially relative the abutment surface to engage the tine and deform the bight into fixed engagement with the hose.

REFERENCE TO RELATED APPLICATIONS

The present invention is directed to apparatus for assembling a specific type of hose clamp on the end of a section of a hose. Hose clamps normally fall into two basic groupings, the radially actuated type and the tangentially actuated type. Hose clamps of these two types utilizing a reverse-bent tine to provide a positioning and holding bight are disclosed in copending applications identified as follows:

Application Ser. No. 620,472, filed Mar. 3, 1967, in the name of Clarence C. Tetzlaff and George Chamberlain, and entitled "Hose Clamp with Hose-Attaching Means," now Patent No. 3,407,448.

Application Ser. No. 668,788, filed Sept. 19, 1967, now Patent No. 3,454,996 in the name of Clarence C. Tetzlaff and George Chamberlain, and entitled "Wire Hose Clamp."

The present application and both of the aforementioned copending applications are owned by a common assignee.

BACKGROUND OF INVENTION

The invention herein has been developed primarily for use with hose clamps used in conjunction with internal combustion engines. One problem encountered in the production line assembly of internal combustion engines is that in a high percentage of cases the cooling systems will leak when the engine is first operated. One source or cause of leakage has been traced to the improper positioning of the clamps which are used to attach sections of rubber hose between the pipe ends or spuds of the engine cooling system. It can be appreciated that proper sealing at the points of connection require that the clamp be positioned on the hose such that when the clamping force is exerted the rubber hose is compressed about the pipe or spud end.

In an effort to alleviate this problem of improper positioning and to render the production line assembly of automobile engines foolproof, in recent years manufacturers have resorted to stapling the clamps to the sections of hose in the proper position; i.e., spaced a specific distance from the hose end to insure proper sealing. However, while this method proved satisfactory in some respects it was necessary that the staples penetrate entirely through the hose on both sides of the clamp. Accordingly, the hose was materially weakened, the point where the staple pierced the hose on the side thereof subjected to fluid pressure gave rise to a source of leakage, and thirdly, the clamps could not be removed without severly damaging the hose. To overcome the disadvantages of the stapling method of preassembly, the hose clamps of the aforementioned pending applications, Ser. Nos. 620,472 and 668,788 were developed. A detailed discussion of the clamp construction and the overall problems briefly alluded to above can be found in said applications. Suffice it to say, that these problems were solved by utilizing a clamp having a reverse-bent tine which forms a positioning bight extending laterally of the clamp. The bight is formed such that the hose end may be received therein properly to space the clamp from the hose end; after the clamp is so spaced the proper circumferential orientation is selected and the tine crimped or deformed into holding engagement with the hose.

With the above discussed clamping arrangement the hose is engaged by the sharp end of the tine only on the side of the clamp opposite that subjected to the line pressure, and also in an area or section of the hose remote from that subjected to the holding and sealing pressure exerted by the clamp upon assembly to the pipe end. While the clamps disclosed and discussed in detail in the aforementioned copending applications solve the assembly line problems of leakage, and are far superior to clamps stapled in position, their usefulness is increased by apparatus that will permit relatively fast, inexpensive and accurate assembly of the clamps to the hose ends. The present invention provides just such apparatus and also affords additional advantages which will be indicated hereinafter.

SUMMARY OF INVENTION

The invention is characterized by apparatus which provides means to support a section of hose having a clamp of the type previously discussed positioned loosely thereon, said means comprising a generally planar support surface against which the end face of the hose may be disposed and an arcuate abutment surface against which the outer periphery of the hose may be engaged. Further the apparatus of the present invention utilizes mandrel means which reciprocate relative to the aforementioned support means to engage the tine and deform same into a holding engagement with the hose.

Accordingly, the primary object of the invention is to provide apparatus whereby the aforementioned hose clamps may be secured quickly and accurately to the ends of a section of hose.

Another important object of the invention is to provide apparatus whereby a hose clamp having a reverse-bent tine extending laterally thereof to form a positioning and holding bight may be fixedly secured to a section of hose by deforming and crimping said tine about the hose end.

Still another object of the invention is to provide apparatus of the class described which provides positioning means adapted to be engaged with a portion of the clamp to insure the proper orientation of the clamp with respect to the tine deforming mandrel.

Likewise, it is an object of the invention to provide apparatus of the type described above wherein the positioning means is adjustably affixed to the apparatus frame whereby clamps with reverse-bent tines at varying circumferential positions may be affixed to the hose end sections.

A further object of the invention is to provide apparatus of the type described wherein the shape of the positioning means may be varied to accommodate either a radially actuated or tangentially actuated clamp.

Other objects and advantages will become apparent from the description of the preferred embodiments illustrated in the attached drawings.

DESCRIPTION OF THE ILLUSTRATED EMBODIMENT

As was discussed previously, the primary function of the present invention is to provide apparatus which will quickly and effectively attach a specific type of hose clamp to the end of a section of hose. The specific clamps themselves are described in detail in the aforementioned pending applications Ser. Nos. 620,472 and 668,788; however, for the purposes of this invention it should be understood that the clamps, irrespective of whether they are tangentially or radially actuated, are all provided with at least one reverse-bent tine that forms a hose receiving and positioning bight. The bight is adapted to receive the end of a hose section therein and then adapted to be deformed into engagement with the hose fixedly to secure the clamp thereon spaced the desired distance from the hose end and in the proper circumferential orientation.

Figure 1:
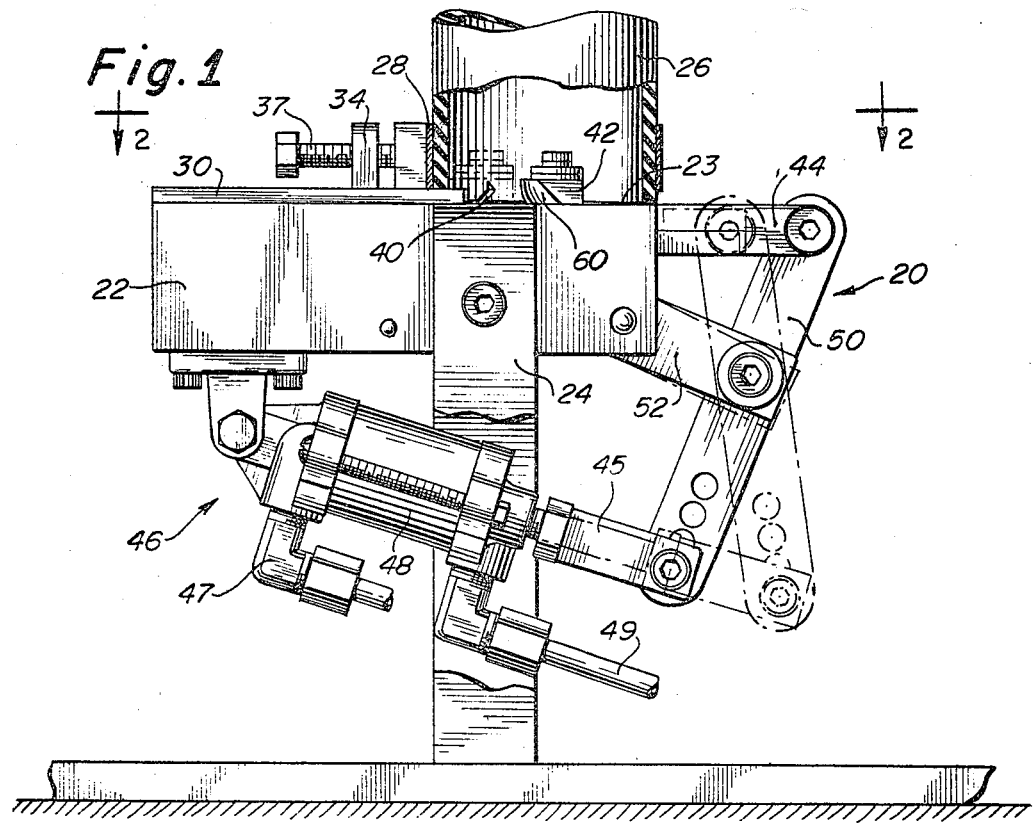
FIG. 1 is a side elevational view of the apparatus of the present invention with a section of hose and an associated clamp supported in position to have the tine deformed into holding engagement with the inner wall of the hose. In addition, portions of the hose and the supporting means for the frame have been broken away to expose to view the tine deforming mandrel and the fluid-operated cylinder used to effect movement of said mandrel.

Referring now to the drawings, in FIG. 1 the basic construction of the apparatus of the present invention is illustrated and designated generally 20. The apparatus includes a frame 22 which, in the illustrated embodiment, is supported in the horizontal plane by a pair of legs or standards 24. The upper surface of the frame 22, designated 23, provides a supporting area against which the end face of the hose 26 is disposed prior to deforming. The hose 26 has the clamp 28 positioned thereon, but not fixedly secured thereto, as yet.

Figure 2:
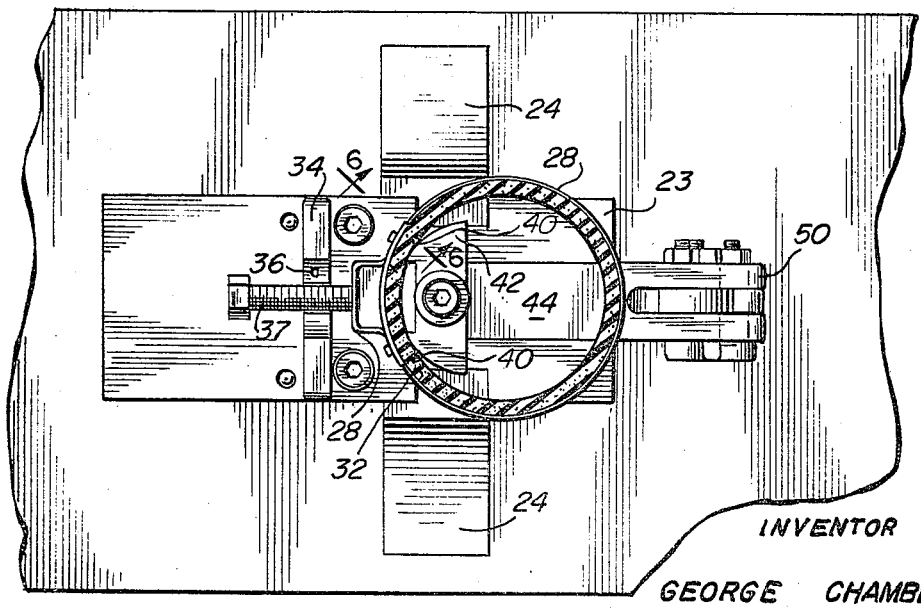
FIG. 2 is a top plan view taken along the line 2—2 of FIG. 1 and in the direction indicated.
Figure 7:
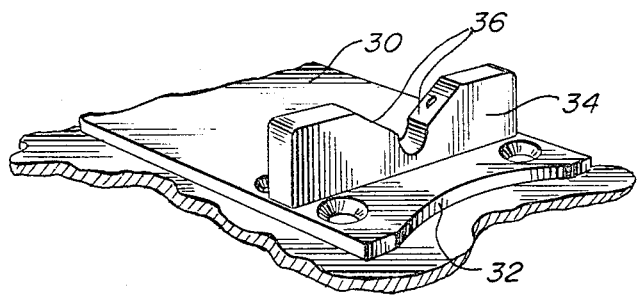
FIG. 7 is a perspective view of the plate utilized with the apparatus of FIGS. 1 and 2 to define the arcuate abutment surface and provided with positioning means for a radially actuated clamp.

In addition, a plate 30 is secured to the upper support surface 23, the end face 32 of which is arcuate and sized to conform to the outer circumference of the hose 26. Accordingly, end face 32 provides an abutment and positioning surface disposed transverse to the supporting surface 23 and against which the outer periphery of the hose 26 may be engaged. Further, plate 30, best viewed in FIG. 7, is provided with an upstanding flange 34 which has a V-shaped groove or notch 36 formed therein. With reference to FIGS. 1 and 2, it can be seen that when a hose clamp of the radially actuated type is used, the screw 37 may be disposed in the V-shaped groove or notch 36 to fix the position of the clamp relative to the remainder of the apparatus.

To effect the deformation of the tine or tines on the clamp 26, which are designated 40, the apparatus is provided with a reciprocating mandrel 42. Mandrel 42 is slidably mounted to the upper support surface 23 such that it is adapted to be indexed between a first position, illustrated in FIG. 1, and a second position, illustrated in FIG. 2. The first position allows the hose 26 and associated clamp 28 to be positioned operably with respect to the apparatus, while the indexing of the mandrel to the second position brings the mandrel 42 into engagement with the tine 40 to deform same and drive same into contact with the inner wall of the hose.

Figure 3:
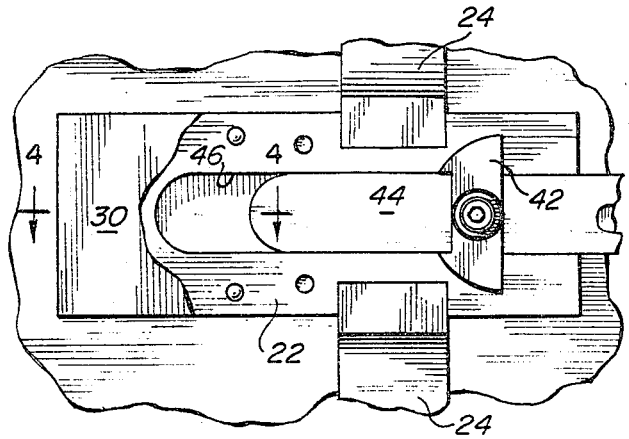
FIG. 3 is a fragmentary top plan view of the apparatus illustrated in FIG. 1 with a portion of the plate that defines the arcuate abutment surface and that carries the positioning means being broken away to illustrate the mounting of the slidable link which carries the tine deforming mandrel.
Figure 4:
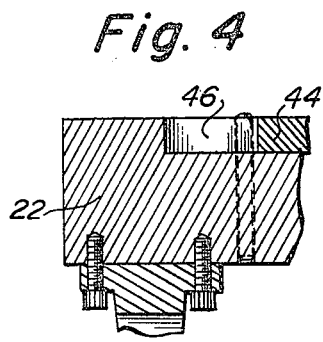
FIG. 4 is a fragmentary sectional view taken along the line 4—4 of FIG. 3 and in the direction indicated.

The reciprocating mounting of the mandrel 42 is effected by the utilization of a link 44 slidably disposed in a channel 46 formed in the frame 22 and opening to the upper support surface 23. Mandrel 42 is affixed to the upper portion of the link 44; said upper portion of the link being disposed either flush with or slightly below the supporting surface 23. This construction is best illustrated in FIGS. 3 and 4.

Directing attention again to FIG. 1 there are illustrated the actuating means which index the mandrel 42 between the aforementioned first and second positions. In the disclosed embodiment the actuating means, which are designated generally 46, in this case comprise an air cylinder 48 which has a double acting piston (not shown) mounted thereon; said piston being operated through valves etc. by the air lines 47 and 49, respectively. The connecting rod 45 effects movement of the slidable link 44 through intermediate or pivotal link 50. The pivoted link 50 is in turn affixed to the frame 22 by an additional link 52 which in effect provides a fulcrum for the pivotal link 50.

To assure smoothness of operation and freedom from binding of the parts, both the air cylinder 48 and the fulcrum link 52 are pivotally mounted to the frame 22. The position of the connecting rod 45 and the links 44, 50 and 52 when the mandrel is in the first mentioned position is illustrated in full lines in FIG. 1, while the position of these elements when the mandrel 42 is indexed to the second position is illustrated in phantom in FIG. 1.

Briefly then, the basic operation of the apparatus disclosed is as follows: After the clamp 28 has been positioned on the hose 26, this being easily accomplished since the tines 40 are in the spread or open position, the hose end is engaged with the upper support surface 23 while the outer periphery of said hose adjacent said tines is disposed against the arcuate abutment surface 32. Also, at this time to assure proper positioning of the hose clamp during the deforming operation the actuating member of the clamp is engaged with the positioning means formed on the plate 30; in the illustrated embodiment the screw 37 is engaged in the V-shaped notch 36. Since the reverse-bent tine 40 which forms the bight extends laterally of the clamp and is normally disposed on the clamp in the immediate area of the actuating means, the outer portion of the tine 40 is disposed against the arcuate abutment surface 32, as clearly illustrated in FIGS. 6A-6C. With the hose and associate clamp thus positioned the operator actuates the double acting piston which will, through connecting rod 45, link 50 and slidable link 44, index the mandrel from the position illustrated in FIG. 1 to that illustrated in FIG. 2. Upon movement of the mandrel 42 to the position illustrated in FIG. 2, the forward portion of the mandrel 42 will engage the tine 40 to deform and drive said tine 40 into contact with the hose 26. The deformation of the tine 40 is illustrated sequentially in FIGS. 6A, 6B and 6C wherein the cooperation between the abutment surface 32 and the mandrel 42 to deform and drive the tine 40 into contact with the hose 26 is shown in detail. Once the tine 40 is deformed the operator merely actuates the double acting piston in the opposite position to reciprocate the mandrel 42 back to the position illustrated in FIG. 1.

As an alternative to the double acting piston illustrated it would be possible to use a single acting piston with spring means to return the mandrel to the position illustrated in FIG. 1. Obviously various types of actuating means, other than that illustrated, could be used to effect movement of the mandrel 42 without departing from the spirit and scope of the invention.

Figures 6A, 6B, 6C:
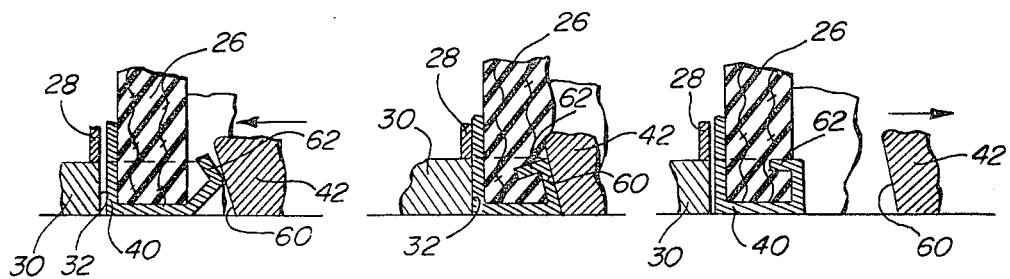
FIGS. 6A, 6B and 6C are partial sectional views taken along the line 6—6 of FIG. 2 and illustrating the sequential or step-by-step deforming of the tine into holding engagement with the inner wall of a hose.

With reference again to FIGS. 6A, 6B and 6C, in the illustrated embodiment the mandrel 42 is provided with a tapered abutment surface 60 on the forward end thereof. Hoses of this type are normally fabricated from extremely resilient material and tend to regain their original shape after being compressed; accordingly, it is necessary to deform the tine a sufficient amount to insure that after the hose regains its original shape the tine will still engage the inner wall of said hose. Thus, as shown in FIG. 6B, the use of the tapered abutment surface 60 permits the free end portion of the tine 40 to be bent inwardly further than the remaining portions thereof. Accordingly, when the hose regains its original shape penetration of the hose wall by the prong 62 is assured, and the free end of the tine will closely engage the inner peripheral surface of the hose.

Figure 8:
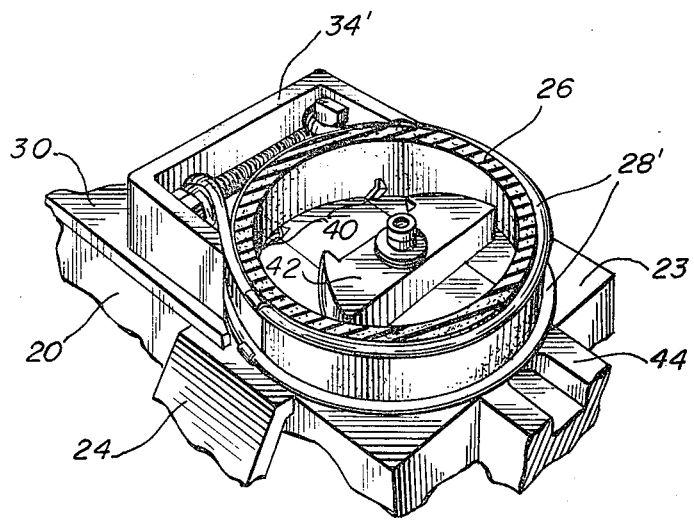
FIG. 8 is a partial perspective view of still another embodiment of the invention wherein the plate which defines the arcuate abutment surface is provided with positioning means for a tangentially actuated clamp.

Directing attention to FIG. 8, an alternative embodiment to the previously discussed positioning means formed on flange 34 is illustrated. As was noted in regard to FIGS. 1, 2 and 7, the positioning means in the form of the V-shaped groove or notch 36 was designed to accommodate a radially actuated clamp which normally utilizes a screw arrangement, such as the type illustrated. However, as is fully disclosed in the aforementioned copending applications, use of the reverse-bent tine arrangement for proper positioning of a hose clamp may also be used in conjunction with both band and wire type clamps, as well as with clamps that employ tangential actuating means, a clamp of the latter type being clearly illustrated in FIG. 8. With a tangentially actuated clamp it is preferred that the plate 30 be provided with an upstanding C-shaped flange 34'. The flange 34' is adapted to have the portion of the clamp 28' carrying the tangential actuating means received therein to fix the position of said clamp relative to the arcuate abutment surface 32 and the mandrel 42. Obviously, the clamping or deforming operation is the same as that previously described.

It is anticipated and envisioned that the two disclosed positioning arrangements could be combined in one arrangement by merely providing the C-shaped flange 34', illustrated in FIG. 8, with a V-shaped groove or notch similar to that used on the upstanding flange 34.

The embodiments of the invention discussed above and illustrated in FIGS. 1–4, 7 and 8 are adapted to accommodate hose clamps of the type described wherein the tine or tines 40 are formed on the clamps in the immediate area of the actuating means. However, as disclosed in the previously mentioned copending applications, it is possible to position the deformable tine elements at points circumferentially spaced from the actuating means. To accommodate this type of clamp the arrangement of FIG. 5 has been devised, wherein the relative disposition of the positioning means may be varied.

Figure 5:
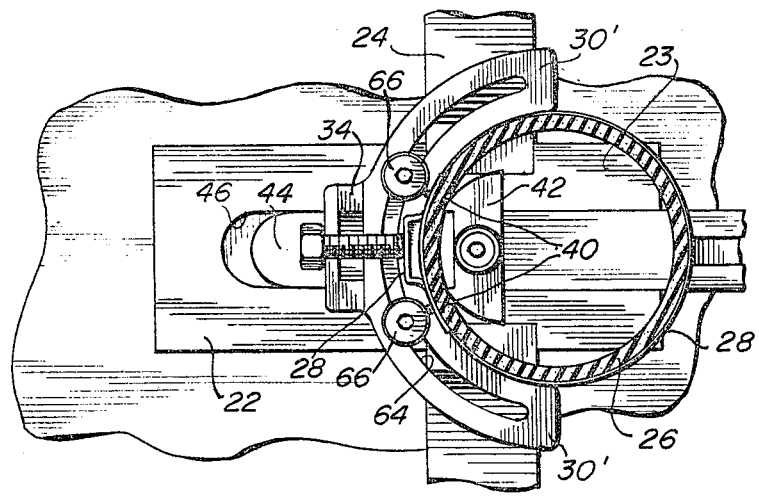
FIG. 5 is a fragmentary top plan view of a modified version of the apparatus illustrated in FIG. 1, wherein the plate defining the arcuate abutment surface and carrying the positioning means is adjustably mounted to the frame.

In FIG. 5, there is provided a plate member 30' with an upstanding flange 34 formed thereon having positioning means in the form of the V-shaped groove or notch 36 formed therein. Obviously, in place of the V-shaped groove 36, the C-shaped flange arrangement of FIG. 8 could be used as an alternative arrangement. The adjustable mounting of plate 30' is effected by use of an arcuate slot 64 through which mounting screws 66 are passed and engaged with the frame 22. Accordingly, to adjust the relative disposition of the positioning means the operator need only loosen screws 66 and move the plate 30' to the desired position. Thus, when the actuating member of the clamp is disposed in engagement with the positioning means, the tine or tines 40 will be properly positioned relative to the mandrel 42 and the arcuate abutment surface 32, such that deformation of the tines may occur as illustrated in FIGS. 6A, 6B and 6C.

While the illustrated embodiments of the invention have been described in detail, this has been done for purposes of clarity and understanding, and it is contemplated that the variations in certain structural features of the embodiments of the invention described and illustrated may occur to the skilled artisan to achieve the same desired advantages and functions. For example, the frame 22 need not be disposed in the horizontal plane and further the actuating means may take forms other than that as illustrated.

What is desired to be secured by letters patent of the United States is:

1. Apparatus for securing a clamp to an end of a section of conduit, said clamp having at least one reverse-bent tine extending laterally therefrom to form a positioning and securing bight, an end wall of said conduit being received within said bight, said apparatus comprising:
 (a) a substantially planar support surface for supporting the end face of said conduit with said clamp positioned thereon,
 (b) conduit positioning means disposed transverse to said support surface, said conduit positioning means having an abutment surface conforming in shape to the outer periphery of said conduit for positioning said end face,
 (c) a reciprocating mandrel slidably mounted on said support surface within the confines of the circumference of said conduit, said mandrel adapted to move radially relative said abutment surface, and
 (d) a tine-engaging surface formed on said mandrel for engaging said tine and deforming said bight into fixed engagement with said conduit.

2. Apparatus as claimed in claim 1 in which said conduit positioning means is a plate and said plate is removably affixed to said support surface.

3. Apparatus as claimed in claim 1 including clamp positioning means associated with said conduit positioning means having structure for receiving a portion of said clamp to position said clamp and said tine relative to said mandrel.

4. Apparatus as claimed in claim 3 in which said clamp positioning means is adjustably mounted to said conduit positioning means to accommodate clamps in which the tines are at different circumferential positions.

5. Apparatus as claimed in claim 3 in which said clamp positioning means comprises an upstanding flange, said flange having a substantially V-shaped groove provided therein for receipt of the screw member of a radial type clamp.

6. Apparatus as claimed in claim 3 in which said clamp positioning means comprises an upstanding substantially C-shaped flange for receipt of the ears of a tangential type clamp.

7. Apparatus as claimed in claim 3 in which said conduit positioning means comprises a plate having an arcuate slot, fastening means disposed in said slot for engagement with said plate whereby said plate may be adjusted relative to said support surface and said mandrel to vary the circumferential disposition of said clamp positioning means to accommodate clamps having tines at varying circumferential positions.

References Cited

UNITED STATES PATENTS

| | | | |
|---|---|---|---|
| 577,015 | 2/1897 | Eshman | 29—237 |
| 1,018,207 | 2/1912 | Mueller | 29—237 X |
| 2,020,348 | 11/1935 | Bebie. | |
| 2,622,652 | 12/1952 | Conroy | 29—237 |
| 2,676,391 | 4/1954 | Elder | 29—237 X |
| 3,348,292 | 10/1967 | Turner | 29—237 |
| 3,365,218 | 1/1968 | Denyes | 24—19 X |

ROBERT C. RIORDON, Primary Examiner

J. C. PETERS, Assistant Examiner